J. E. BRODIE.
STEAM PIPE COUPLING FOR CARS.
APPLICATION FILED FEB. 18, 1909.
930,933.
Patented Aug. 10, 1909.
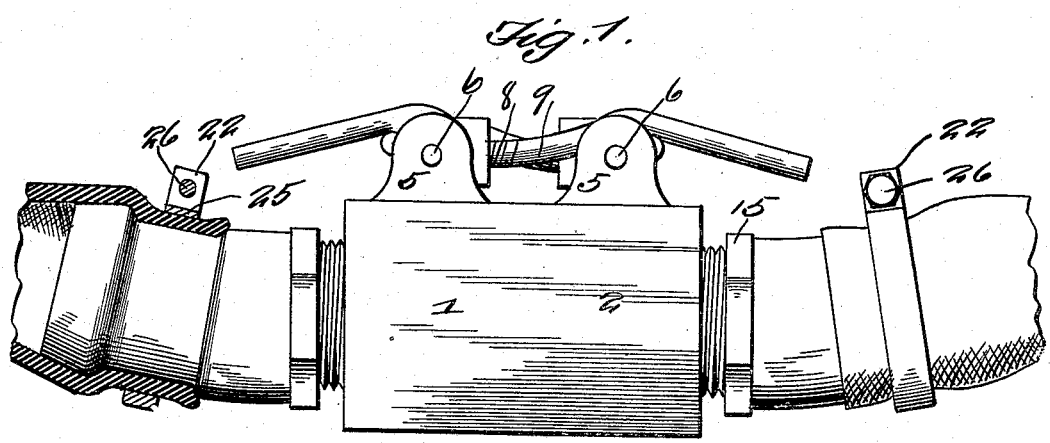
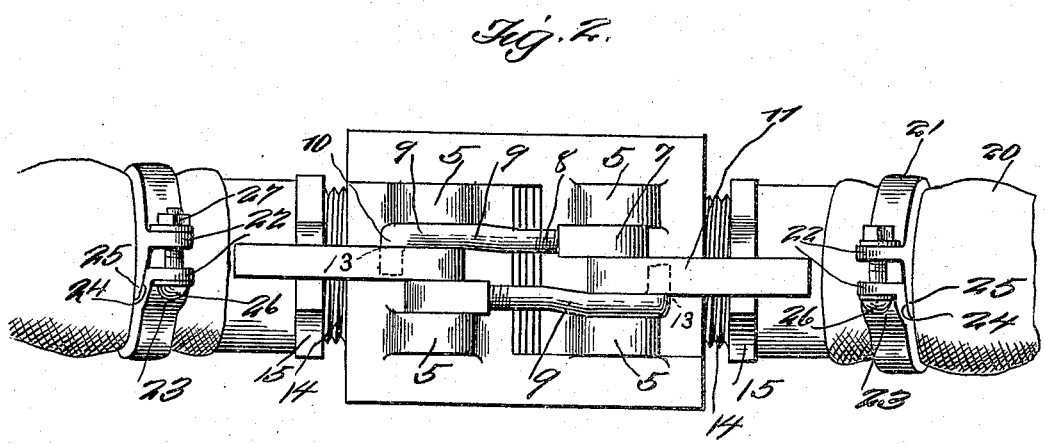
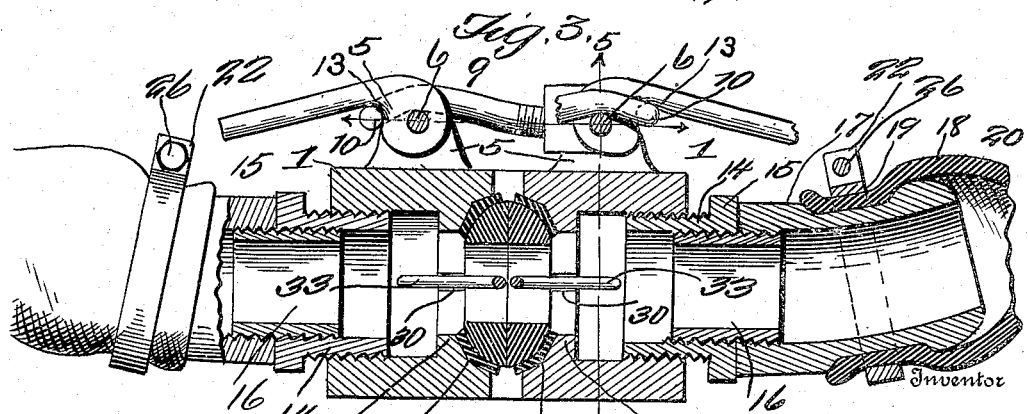
Witnesses
R. A. Boswell.
A. M. Whitmore.
Inventor
John E. Brodie,
By E. B. Whitmore,
Attorney J. E. BRODIE.
STEAM PIPE COUPLING FOR CARS.
APPLICATION FILED FEB. 18, 1909.
930,933.
Patented Aug. 10, 1909.
2 SHEETS—SHEET 2.
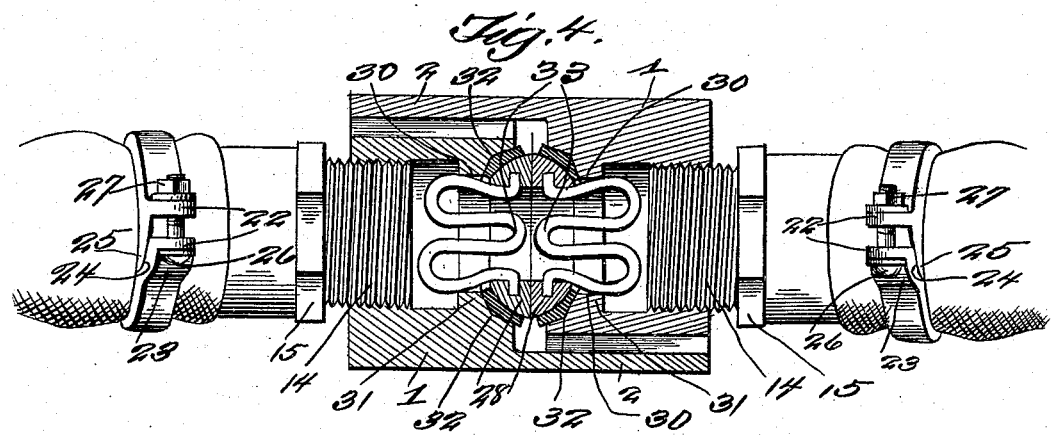
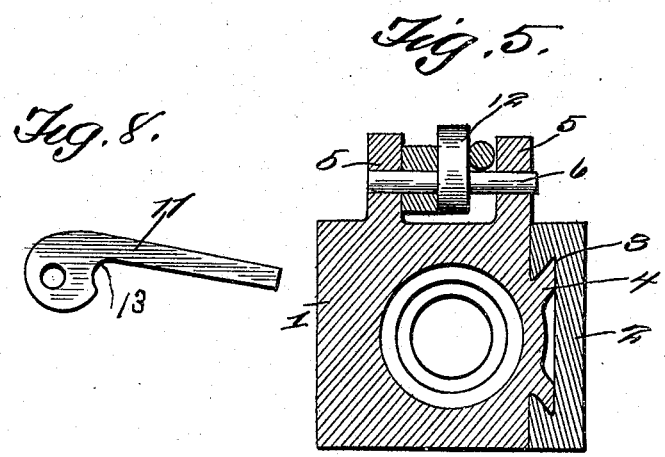
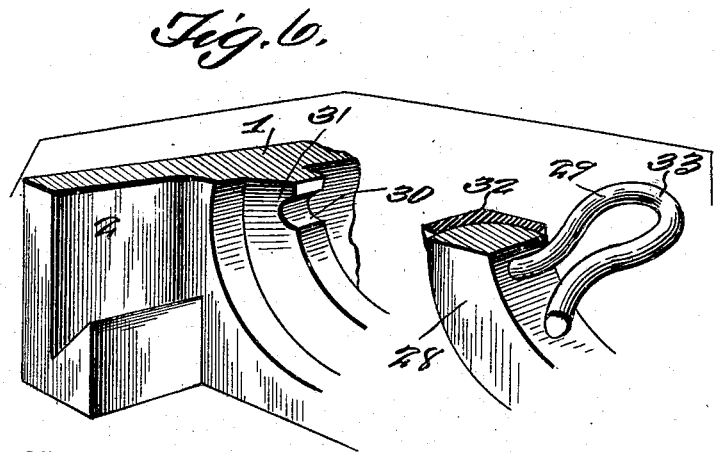
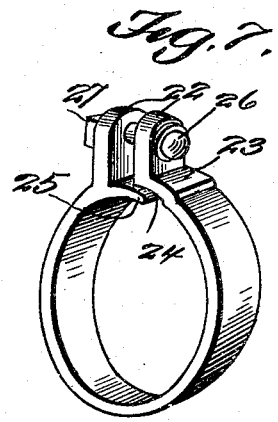
Witnesses
R. A. Boswell,
A. M. Whitmore.
Inventor
John E. Brodie,
By E. B. Whitmore,
Attorney

UNITED STATES PATENT OFFICE.

JOHN E. BRODIE, OF ROCHESTER, NEW YORK, ASSIGNOR OF ONE-HALF TO CHRISTOPHER GREY, OF ROCHESTER, NEW YORK.

STEAM-PIPE COUPLING FOR CARS.

No. 930,933.            Specification of Letters Patent.           Patented Aug. 10, 1909.

Application filed February 18, 1909. Serial No. 478,709.

*To all whom it may concern:*

Be it known that I, JOHN E. BRODIE, of Rochester, in the county of Monroe and State of New York, have invented a new and useful Improvement in Steam-Pipe Couplings for Cars, which improvement is fully set forth in the following specification and shown in the accompanying drawings.

This invention relates to certain new and useful improvements in devices for coupling or connecting the steam pipes of cars between the adjacent ends thereof.

The present invention has for its objects among others to provide a simple and improved construction of coupler for joining the rubber steam pipes used on railroads, that can be easily operated and in which provision is made for quickly and readily tightening or adjusting the parts to compensate for wear in the gaskets, or for other purposes. The coupler is constructed on the dove tail plan and in case the end which holds the hose to the coupler should become broken, it may be easily replaced without destroying the coupler block, as the connection of the hose is fitted into the head of the coupling block by means of a Bushnell screw which may be readily replaced on a moment's notice. The construction is such that should the train separate, the coupler will part without doing any damage to the hose or to the train.

I aim further at improvements in the details of construction, facilitating the manufacture and assemblage of the parts and insuring efficiency in operation, and durability.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation showing the two parts of hose coupled together. Fig. 2 is a top plan of Fig. 1. Fig. 3 is a substantially central longitudinal section through Fig. 1. Fig. 4 is a longitudinal section at right angles to Fig. 3. Fig. 5 is a cross section on the line 5—5 of Fig. 3. Fig. 6 is a perspective detail partly in section, showing one of the gaskets and its coöperating socket. Fig. 7 is a perspective view of one of the clamping bands. Fig. 8 is a detail of one of the locking levers.

Like numerals of reference indicate like parts in the several views.

The present device comprises two interlocked sections, each carrying a gasket or packing ring and adapted to form a steam-tight joint between them.

1 designates one of the heads formed upon one side with a longitudinally extending portion 2 which is formed with a dovetailed groove 3 adapted to receive a correspondingly shaped rib or the like 4 on the adjacent face of the adjoining head or section, as seen most clearly in Fig. 5. These dovetailed gib pieces or inwardly projecting longitudinal slides of the two sections or heads are, in this instance, shown as integral with the heads, the projecting end parts 2 of the heads being of such length that, when the parts are coupled, the ends thereof will be substantially flush with the body portions of the opposed heads, as seen clearly in Fig. 4. Each of the heads 1 is provided upon the upper face of the same with lugs 5 in pairs, as seen clearly in Fig. 2, and also in Fig. 5, in each pair of which is mounted a cross shaft 6, which is made tight at its ends in the said lugs, in any suitable manner, as by tightly upsetting their ends, or otherwise, so as to prevent endwise movement of the shafts in their bearings. On each shaft 5 is mounted for limited revolution a block 7 into which is adjustably threaded the threaded end 8 of a link or rod 9, the free end of which is offset laterally, as shown at 10. By reason of this threaded engagement of the member 9 with the block 7, the same may be screwed into the head at any time for the purpose of taking up the wear or any lost motion of the rod or link. Also mounted upon each shaft 5 for limited revolution is a locking lever 11. The extended parts or heads of these locking levers are eccentric, as seen best at 12 in Fig. 5, and are designed to act upon the inturned ends 10 of the links or rods 9 after the manner of cams, the inturned ends of said links or rods dropping into recesses 13 in the extended or head portions of said levers when the levers are turned down, as seen in Figs. 2 and 3, so that the parts are locked against accidental separation. These recesses, however, are so formed that when it is wished to uncouple two cars so as to separate them and draw one away from the other, or in case the cars become accidentally uncoupled or separated, the strain will cause rotation of the locking levers 11 and the steam pipe coupling will pull apart when one car is drawn away from another without any attention on the part of the trainmen.

In the outer end of the body portion of each head 1 is a short screw threaded nipple or the like 14 having a hexagonal or polygonal portion 15 for the reception of a wrench or other means by which it may be turned, and in this member 14 is shown as screw threaded a short pipe connection 16 upon which is engaged the pipe nipple or the like 17 which is screwed up against the hexagonal head 15, the member 17 being of usual construction in this art having the enlargement 18 at its outer end and the annular depression 19, so that the flexible hose 20 may be engaged thereover and held securely in place by any of the well-known means as by a clamp 21 having ears 22 at its point of division, the one end of the ring or clamp having an exteriorly thickened portion 23 with interiorly cut-away portion or recess 24 for the reception of a projecting flange 25 on the opposite end portion. A bolt 26 and nut 27 complete the means for fastening the hose end in place.

28 are metal, preferably brass, rings or disks that are designed to meet or contact to form a tight joint. They are held to the respective sections of the heads by bent wire springs 29 projecting into the heads, there being narrow recesses 30 formed on opposite sides of an inwardly-projecting rim or flange 31 on the head, as seen clearly in Figs. 4 and 6.

32 is a loose ring back of the metal ring, made of any suitable material suitable for packing, such as fiber, very hard india rubber, or the like, said ring 32 being shaped to fit the rounded inner face of the metal ring, being substantially spherical and free to adapt itself to the varying positions of the metal ring.

The metal rings are held tightly in place by the springs 29 yet they may be pulled out when desired by a sudden pull upon the bend 33 of the ring as will be readily understood upon reference to Fig. 4.

With the parts constructed and arranged substantially as above described and as shown in Figs. 2 and 3, when the two heads are brought together as seen in Fig. 3 the two rings 28 contact, and when the links or rods 9 are thrown into their horizontal position as seen in Fig. 2, so that their right angled portions 10 lie in the path of the locking levers 11 and then the said locking levers are turned down into the position seen in Figs. 1, 2 and 3; the right angled ends engage in the recesses 13 in the cam portions of the levers and upon further movement of the locking levers the heads are drawn together and the parts locked, a steam tight joint being assured.

As seen in Fig. 3 the bent ends of the rods 9 are seated in the recesses 13 sufficiently to prevent accidental separation of the parts, but should the cars be separated the endwise pull will cause a pull on the head and link of the car to which the pull is applied and thus the right angled end of the link will have a tendency to release the locking lever and allow it to be thrown over so that the coupling will be pulled apart without injury.

When necessary adjustment may be made to compensate for wear, by screwing up on the rods 9 so as to bring the bent end thereof nearer the recess in the locking lever.

As the two parts are brought together it is to be understood that the two extended parts 2 engage the dovetail projections or ribs 4 on the opposing members and thus the parts are not only guided together but are securely held against lateral movement.

Modifications in detail may be resorted to without departing from the spirit of the invention or sacrificing any of its advantages.

What is claimed as new is:—

1. A coupling for the purpose stated comprising two like parts, each embodying a head, a shaft thereon, a rod mounted on the said shaft and having one end inturned, and a locking lever mounted on said shaft and adapted to engage the inturned end of the rod on the opposed part.

2. A coupling for the purpose stated, comprising two members, each composed of a head, a shaft thereon, a block mounted on said shaft, a rod adjustable in the block, and a locking lever on the shaft and adapted to engage the rod of the opposed member.

3. A coupling for the purpose stated, comprising two opposed members each embodying a head, said heads having interengaging slidable portions, shafts on the heads, a rod mounted on each shaft and having its free end turned at substantially a right angle, and a locking lever on each shaft having a portion to engage the right angled end of the rod on the opposed member.

4. A coupling for the purpose stated, comprising two opposed members, each embodying a head, shafts on the heads, a locking lever on each shaft having a recess, and a rod on each shaft having at its free end an angular portion to engage in the recess of the opposed lever.

5. A coupling for the purpose stated, comprising two opposed members each embodying a head, the heads having interengaging portions, rings in the opposed ends of the heads, and means on the heads embodying oppositely disposed levers and rods with inturned ends mounted on common shafts on each of said members for drawing said rings together and locking the heads to form a tight joint.

6. A coupling for the purpose stated, comprising two opposed members each embodying a head, said heads having interengaging portions, rings in the adjacent ends of the heads, rods on the heads having angled ends, shafts on which said rods are mounted, locking levers mounted on the shafts of said rods and acting on said rods, and means for compensating for wear.

7. A coupling for the purpose stated, comprising two opposed members each having a shaft, a rigid rod mounted to turn on the shaft, each rod having an inturned free end, and a locking lever, the lever and rod of each member disposed in opposite directions and mounted on the same shaft, each lever having a cam head with a recess to receive the inturned end of the opposed rod.

8. A coupling for the purpose stated, comprising two opposed members each embodying a head, the heads having interengaging members, a rod mounted on each head, a rod on each shaft and having inturned ends, and a locking lever mounted to turn on each shaft and having an enlarged head with recess, the recesses receiving the inturned ends of said rods and being constructed to allow of uncoupling under abnormal strain.

In witness whereof, I have hereunto set my hand this 15th day of February, 1909, in the presence of two subscribing witnesses.

JOHN E. BRODIE.

Witnesses:
  E. B. WHITMORE,
  A. M. WHITMORE.